C. H. DOWNES.
Pen and Pencil Cases.
No. 5,518. Reissued August 5, 1873.
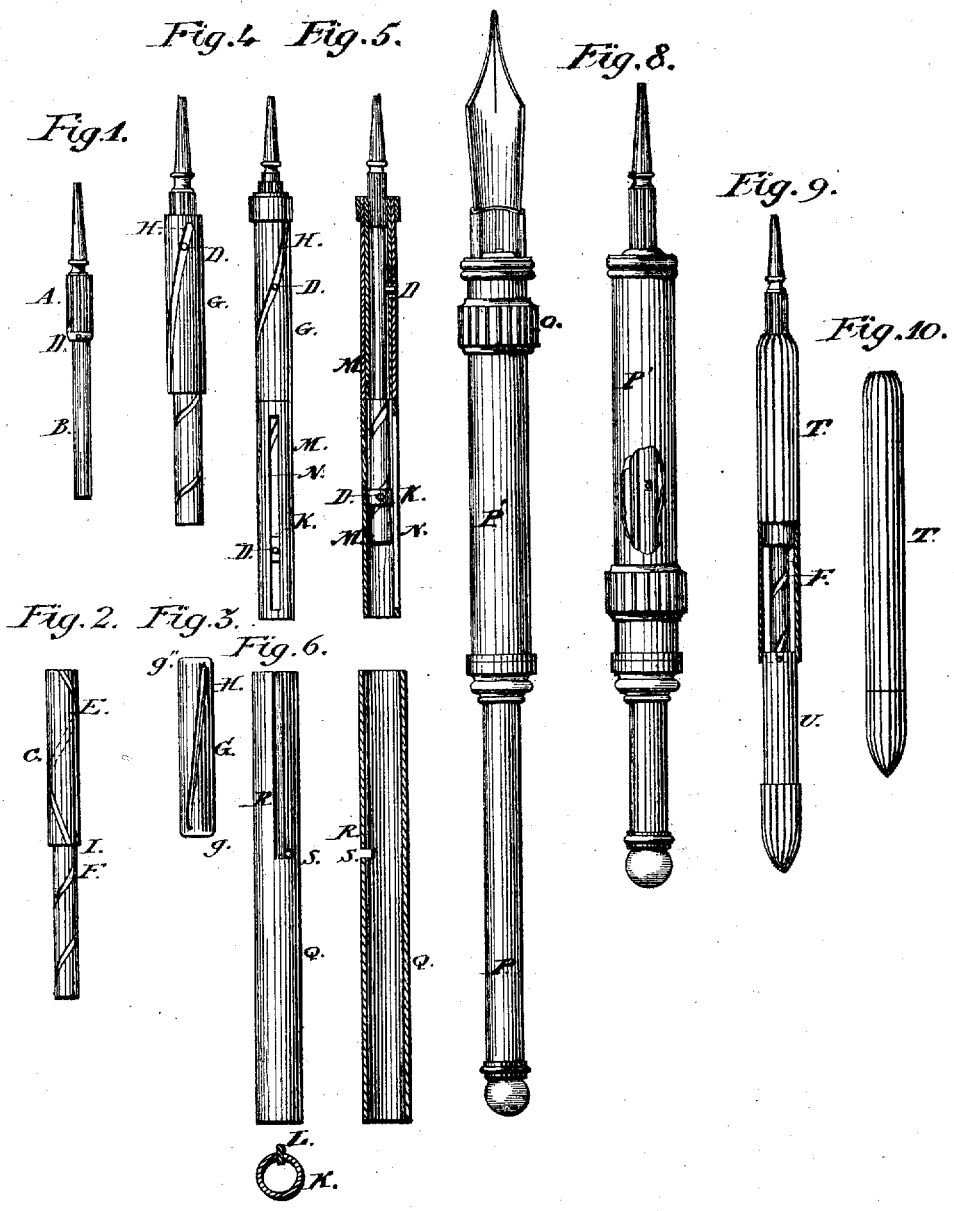
Attest;
A. H. Norris.
S. M. Pool
Inventor;
Chas. H. Downes.
By James L. Norris.
Associate Atty.
AM. PHOTO-LITHOGRAPHIC CO. N.Y. (OSBORNE'S PROCESS.)

UNITED STATES PATENT OFFICE

CHARLES H. DOWNES, OF HUDSON CITY, NEW JERSEY.

IMPROVEMENT IN PEN AND PENCIL CASES.

Specification forming part of Letters Patent No. 107,672, dated September 27, 1870; reissue No. 5,518, dated August 5, 1873; application filed June 24, 1873.

*To all whom it may concern:*

Be it known that I, CHARLES H. DOWNES, of Hudson City, in the county of Hudson and State of New Jersey, have invented a new and useful Improvement in Telescopic Pen and Pencil Cases; and I do hereby declare that the following is a full, clear, and exact description thereof, which will enable others skilled in the art to make and use the same, reference being had to the accompanying drawing, forming part of this specification.

This invention relates to improvements in telescopic pen and pencil cases, of that class wherein the pen or pencil holders are moved out and in the sheaths or cases by means of spirally-slotted tubes; and it consists in a novel arrangement of the revolving tube and its adjuncts, whereby the spindles or pencil-holders may be made of greater capacity, as hereinafter more fully specified.

In the drawing, Figure 1 is a side elevation of the spindle which carries the pencil, and which is to be slided in and out of the case. Fig. 2 is a side elevation of the revolving tubes with spiral slots, one for being turned by a sliding pin, and the other for operating the pin in the spindle, the pitch of the two slots being reversed in relation to each other. Fig. 3 is an elevation of a short section of tube to be secured to the outer case, and in which the enlarged part of the tube, Fig. 2, works. Fig. 4 is an elevation of the spindle, revolving tube, and the tube shown in Fig. 3, placed in working position. Fig. 5 is an elevation of the same, with the addition, on the reduced end of the revolving tube, of the guiding-tube for the operating-pin, carrying-slide, and for the support of the extension-tube, Fig. 6. Fig. 6 is an elevation of the extension-tube, to be used either as an extension of the case merely for a handle when the pen is used, or for throwing out the pencil. Fig. 7 is an elevation of the finished case, with pen and pencil extensions and the extension-handle, the latter and the pen being drawn out. Fig. 8 is an elevation of the same, with the pencil-holder drawn out, and with a part of the case broken out to show the manner of engaging or disengaging the extension-handle with the tube-operating pin. Fig. 9 is an elevation of a small grooved or fluted case, in common use, with a part broken out, showing the application to it of my improved arrangement of means for throwing out the pencil, whereby a large-sized spindle is made to work in a small case; and Fig. 10 is an elevation of Fig. 9 in the closed position.

In order to be enabled to increase the size of the spindles or pencil-holders A without increasing the size of the cases, or to put the large sized now used into smaller cases, which it is very desirable to do, in order to make the finished article as light and small as possible, I propose to reduce these spindles A or pencil-holders in the rear parts B, as clearly shown in Fig. 1, and I make the spirally-slotted tubes C, by which they are thrown out and in which they work, to correspond in shape thereto. I also arrange the stud D of the spindle, by which it is turned, and which works in one of the slots of the tube C, at the upper end of the large part, instead of placing it at the upper end of the part B, where they are commonly located. The slots E F of the revolving tube are pitched in opposite directions, as in other cases now used. The spindle A is inserted in the large end of the tube C, so that the small end works in the small part of said tube C, and the pin at D is arranged to work in the slot E. This tube C is then inserted in the short tube G, covering the large part of C, and having one slot, H, in which the pin D also works. The upper end *g* of G is then milled down over the shoulder I of tube C, and the lower end, *g'*, is milled down over the lower end of tube C to hold it from moving lengthwise, while allowing it to revolve freely. If the pencil-holder, as now arranged, is to be used in the large cases P', shown in Figs. 7 and 8, a slide, K, with a pin, L, projecting through the rim on both sides, is placed on the small part of tube C, and covered by another tube, M, with a straight slot, N, of the same size as G, to which it is attached, as clearly shown in Fig. 5, with one end of the pin engaged in slot F of tube C, and the other in slot N of tube M. This case G M may then be placed in a common exterior slotted case, with a slide of the common sort connected to pin L for working the spindle in and out. The said slide will force it out when drawn toward the upper end, and in when forced back. But for using it in the cases, shown in Figs. 7 and 8, where a pen is also used, and which is moved out and in by the slide-ring O, and for which it is desired to have an extension, P, of the case, and, in order to make this extension available for use either as such as a means of working the pencil in and out, and to dispense with a slide for working it, I employ the tube Q, with a straight slot, R, and notch S, fitted to slide on the tubes G M, taking the pin L in the slot R, and fitted within and attached to the extension P.

By this arrangement, when the extension is shoved home it will force the pin L to the lower end of the slot N, and draw the spindle A in, where it will remain if the extension is drawn directly back, which is done when the pen is to be used; but if the pencil is to be used previous to drawing the extension out, it is turned to the left a trifle, so as to take the pin L in the notch S, then the withdrawal of the extension forces the spindle out.

This construction of the spindle and the revolving tubes enables me to use larger spindles with the fluted extension-cases, Figs. 9 and 10, than could otherwise be done, and which is highly desirable on account of the great favor with which the small cases of this class are received by consumers.

These fluted cases are composed of one large section, T, and one smaller and shorter section, U, at the upper end, sliding in and out of T. The flutes will prevent one from turning in the other, and therefore the slotted guiding tube M is not needed, so that the small section U, armed with a pin, V, for working in the slot F, takes the place of M, and, working in and out of T, which receives the tube G and is fastened to it, works the spindle as required.

Having thus described my invention, I claim as new and desire to secure by Letters Patent—

1. The combination of a spindle or pencil holder, A B, and a revolving spirally-slotted barrel, C, with a short slotted fixed guiding-tube, G, and a slotted extension-tube, Q, substantially as described, for the purpose specified.

2. The combination of a spindle or pencil-holder, A B, and a revolving spirally-slotted band, C, constructed and arranged, substantially as specified, with the short slotted fixed guiding-tube G, as described.

3. The spindle A B having stud D thereon, tube C, having spiral slots E F, short slotted tube G, slotted extension-tube Q combined with case P′, tube M having slot N, slide K, and pin L, all constructed and arranged with respect to each other as specified.

The above specification of my invention signed by me this 20th day of June, 1873.

CHARLES H. DOWNES.

Witnesses:

GILBERT CLARK,

FRANCIS C. BOWEN.